US008452091B2

United States Patent
Oh et al.

(10) Patent No.: US 8,452,091 B2
(45) Date of Patent: May 28, 2013

(54) METHOD AND APPARATUS FOR CONVERTING SKIN COLOR OF IMAGE

(75) Inventors: Hyun-hwa Oh, Yongin-si (KR);
Young-shin Kwak, Suwon-si (KR);
Du-sik Park, Suwon-si (KR);
Chang-yeong Kim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 917 days.

(21) Appl. No.: 11/484,718

(22) Filed: Jul. 12, 2006

(65) Prior Publication Data

US 2007/0031033 A1    Feb. 8, 2007

(30) Foreign Application Priority Data

Aug. 8, 2005  (KR) .................. 10-2005-0072414

(51) Int. Cl.
*G06K 9/00* (2006.01)
*H04N 1/62* (2006.01)
*H04N 9/64* (2006.01)

(52) U.S. Cl.
CPC .............. *H04N 1/628* (2013.01); *H04N 9/643* (2013.01); *G06T 2207/30201* (2013.01)
USPC .......................................... 382/167; 382/118

(58) Field of Classification Search
USPC .......................................... 382/118, 167, 274
See application file for complete search history.

(56) References Cited

U.S. PATENT DOCUMENTS

| 5,130,935 | A | * | 7/1992 | Takiguchi | 382/167 |
| 5,740,274 | A | * | 4/1998 | Ono et al. | 382/190 |
| 5,900,860 | A | | 5/1999 | Ueda | 345/150 |
| 6,154,559 | A | * | 11/2000 | Beardsley | 382/103 |
| 6,219,640 | B1 | * | 4/2001 | Basu et al. | 704/246 |
| 6,252,976 | B1 | * | 6/2001 | Schildkraut et al. | 382/117 |
| 6,567,775 | B1 | * | 5/2003 | Maali et al. | 704/231 |
| 6,671,391 | B1 | * | 12/2003 | Zhang et al. | 382/118 |
| 6,678,407 | B1 | | 1/2004 | Tajima | 382/167 |
| 6,681,032 | B2 | * | 1/2004 | Bortolussi et al. | 382/118 |
| 6,697,502 | B2 | * | 2/2004 | Luo | 382/115 |
| 6,807,290 | B2 | * | 10/2004 | Liu et al. | 382/118 |
| 7,110,597 | B2 | * | 9/2006 | Goldsmith | 382/167 |
| 7,212,674 | B1 | * | 5/2007 | Takemoto | 382/209 |
| 2002/0105662 | A1 | * | 8/2002 | Patton et al. | 358/1.9 |

(Continued)

FOREIGN PATENT DOCUMENTS

| JP | 2-184191 | 7/1990 |
| JP | 2002-203238 | 7/2002 |

(Continued)

OTHER PUBLICATIONS

Wikipedia. (Jun. 2005) "Lazy evaluation."*

(Continued)

*Primary Examiner* — Barry Drennan
(74) *Attorney, Agent, or Firm* — Staas & Halsey LLP (57) ABSTRACT

An image-processing method that converts a skin color of an image is provided, the method including detecting a face region of an image, when a face region is detected in the image, verifying whether the face region is a face by analyzing the characteristics of the face region, and when the region is determined to be a face, extracting a skin region in the image, and converting the skin color of the extracted skin region into a desired skin color.

21 Claims, 5 Drawing Sheets

U.S. PATENT DOCUMENTS

| | | | | |
|---|---|---|---|---|
| 2003/0235333 | A1* | 12/2003 | Lin | 382/167 |
| 2004/0017380 | A1* | 1/2004 | Kim et al. | 345/600 |
| 2005/0041867 | A1* | 2/2005 | Loy et al. | 382/190 |
| 2005/0069219 | A1 | 3/2005 | Wu | 382/274 |
| 2005/0094849 | A1* | 5/2005 | Sung et al. | 382/103 |
| 2005/0271295 | A1* | 12/2005 | Tabata et al. | 382/274 |
| 2007/0041640 | A1* | 2/2007 | Tabata et al. | 382/173 |
| 2008/0298704 | A1* | 12/2008 | Nachlieli et al. | 382/254 |

FOREIGN PATENT DOCUMENTS

| | | |
|---|---|---|
| JP | 2005-027277 | 1/2005 |
| KR | 10-1999-0047902 | 11/1999 |
| KR | 10-2006-0012777 | 2/2006 |
| KR | 10-2006-0106212 | 10/2006 |

OTHER PUBLICATIONS

Rowley et al. (Jan. 1998) "Neural network-based face detection." IEEE Trans. on Pattern Analysis and Machine Intelligence, vol. 20 No. 1, pp. 23-38.*

Zhu et al. (May 2004) "Adaptive learning of an accurate skin-color model." Proc. 6th IEEE Int'l Conf. on Automatic Face and Gesture Recognition, pp. 37-42.*

Chang et al. (Nov. 2000) "Face Detection—Skin Color Model." http://www-cs-students.stanford.edu/~robles/ee368/skincolor.html as archived by The Internet Archive, http://www.archive.org/.*

Hsu et al. (May 2002) "Face detection in color images." IEEE Trans. on Pattern Analysis and Machine Intelligence, vol. 24 No. 5, pp. 696-706.*

* cited by examiner

METHOD AND APPARATUS FOR CONVERTING SKIN COLOR OF IMAGE

CROSS-REFERENCE TO RELATED APPLICATION

This application is based on and claims priority from Korean Patent Application No. 10-2005-0072414 filed on Aug. 8, 2005 in the Korean Intellectual Property Office, the disclosure of which is incorporated herein by reference.

BACKGROUND OF THE INVENTION

1. Field of the Invention

The present invention relates to detecting a face and converting a skin color, and more particularly, to a method and an apparatus for converting the skin color of an image.

2. Description of Related Art

With the development of digital devices, images are increasingly being converted from analog format into digital format. Currently, research is under way in the field in which appliances that digitally capture and store images can process stored digital images so that they satisfy the human visual recognition.

In devices such as digital cameras or digital camcorders that capture and store images, skin color is one of the first elements the eyes focus on. Accordingly, proper conversion of the skin color is important in improving the performance of such digital image devices. In addition, converting the skin color is also important in other software and hardware that converts digital images.

Speed and accuracy are elements that determine the performance of digital image devices and image processing devices. However, the speed and the accuracy deteriorate if a skin color conversion method is applied to images without the aid of a person. For example, in conventional methods disclosed in U.S. Pat. Nos. 5,900,860 and 6,678,407, a skin color is converted into a desirable skin color by using a method of converting colors between a standard color and a targeted color, or by using a lookup table. During this process, however, a background or other objects having similar colors to the skin may be converted into the skin color regardless of whether a face is included in the image. This causes unnecessary processing and wastes both time and processing resources.

Therefore, it is necessary to reduce unnecessary color conversions by checking for the existence of skin in order to perform fast and accurate skin color conversions.

BRIEF SUMMARY

An aspect of the present invention improves the accuracy and speed of a skin color conversion process.

Another aspect of the present invention improves an image processing rate by not performing the skin color conversion with respect to images that do not include the skin.

According to an aspect of the present invention, there is provided an image-processing method that converts a skin color of an image including: detecting a face region of an image; verifying that the face region contains a face by analyzing characteristics of the face region when a face region is detected; extracting a skin region of the image when the face region is determined to contain a face; and converting the skin color of the extracted skin region into a desired skin color.

According to another aspect of the present invention, there is provided an image processing apparatus that converts a skin color of an image, including: a face determining unit that determines an existence of a face by extracting a face region of an image, maintains the image when a face does not exist in the image, and outputs the face region when a face exists in the image; and an image-converting unit that the received face region from face-determining unit, extracts a skin region of the image based on the face region, and converts a skin color of the skin region in the image into a desired skin color.

According to another aspect of the present invention, there is provided an image-processing method, including: detecting whether at least one face region is present in a received image; verifying that a face is present in the detected at least one face region is a face; extracting a skin pixel including a skin color from the input image; and converting the skin color of the extracted skin pixel into a desired skin color based on a skin color model.

According to other aspects of the present invention, there are provided computer-readable storage media encoded with processing instructions for causing a processor to execute the aforementioned methods.

Additional and/or other aspects and advantages of the present invention will be set forth in part in the description which follows and, in part, will be obvious from the description, or may be learned by practice of the invention.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF EMBODIMENTS

Reference will now be made in detail to embodiments of the present invention, examples of which are illustrated in the accompanying drawings, wherein like reference numerals refer to the like elements throughout. The embodiments are described below in order to explain the present invention by referring to the figures.

Embodiments of the present invention are described hereinafter with reference to block diagrams and flowcharts for explaining a method and apparatus for selectively performing a conversion of a skin color of an input image. It will be understood that each block of the flowchart illustrations and combinations of blocks in the flowchart illustrations can be implemented by computer program instructions. These computer program instructions can be provided to a processor of a general purpose computer, special purpose computer, or other programmable data processing apparatus to produce a machine such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded into a computer or other programmable data processing apparatus to cause a series of operations to be performed in the computer or other programmable apparatus to produce a computer implemented process such that the instructions that execute in the computer or other programmable apparatus provide operations for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur in an order that differs from those shown and/or described. For example, two blocks shown in succession may be executed substantially concurrently or the blocks may sometimes be executed in reverse order, depending upon the functionality involved.

Figure 1:
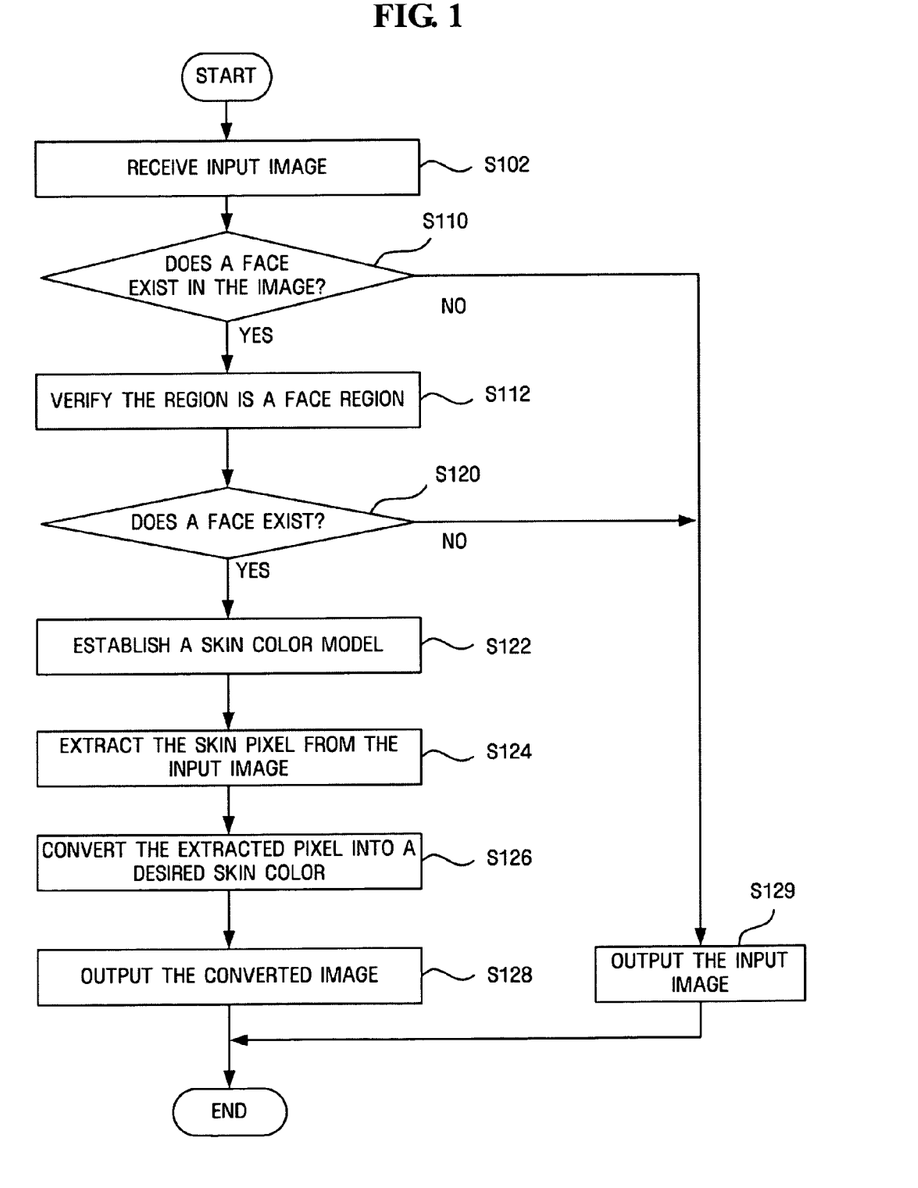
FIG. 1 is a flowchart illustrating a skin color conversion process is performed by detecting a face region in an input image according to an embodiment of the present invention.

FIG. 1 is a flowchart illustrating a process of detecting a face region in an input image and determining whether to apply a skin color according to an embodiment of the present invention.

In operation S102, an image is input. After an image is input, at least one face region of the input image is detected. If the colors on the detected face region are converted into a skin color, errors may be reduced during the conversion. Non-limiting examples of methods for detecting a face region include: an AdaBoost method, a neural network based method, and a statistical method. The AdaBoost is a method where a number of stages composed of weak classifiers are connected in the form of a cascade. Accordingly, if the detection fails in a current stage, a sub-window (face candidates) is determined to be an image, i.e. a "non-face". Only the sub-windows having successful detections in the current stage are input in the next operation, and determined to be a "face" when the detections have been successful throughout all the stages. In order to distinguish an averted or tilted face, the sorter can be taught by using faces respectively tilted toward x-, y-, and z-axes. The sizes of the sub-windows parallel to x- and y-axes are converted and applied in order to detect faces of various sizes, as opposed to detecting a face with a single window.

A neural network based method allows a neural network to determine whether each window includes a face by examining small windows of an image. The method also can provide a better performance by using a plurality of networks, as opposed to using a single network. A face can be determined by extracting a negative example. Here, a neural network-based circuit can be taught using the difference between a true value and a calculated value.

A statistical method is a method of recognizing objects by applying a classifier based on the statistics of localized parts. The classifier calculates the result obtained from matching each part with the images, and derives a probability according to the condition of the corresponding classification. The recognized object is determined through a likelihood ratio test. A method of improving a stage from a low resolution to a high resolution is also proposed herein.

In operation S110, if it is determined that one or more face regions exist, the corresponding face region is analyzed to determine whether it is an actual face. The detection of the face is determined depending on the existence of the region corresponding to the face, and a false alarm may occur. Accordingly, a process is performed for determining whether the detected area is identified as a face region is a face S112. If it is determined that a face does not exist in an image in operation S110, an input image is directly output without converting the skin color with respect to the input image since a skin color conversion does not need to be performed, in operation S129.

In order to verify a face, the characteristics of a face are investigated. For example, a face region can be verified based on information on the size of the detected face region, the proportion of pixels corresponding to the skin color in the face region, or geometrical characteristics of the face such as symmetry S112. If the region detected by the verification methods in operation S112 turns is in operation S120, a process of converting the skin color is performed based on the detected face region. If the region detected by the verification in operation S112 is not a face in operation S120, an input image is directly output without converting the skin color since the skin color does not need to be converted, in an image S129.

When the detection and verification processes are complete (operations S110-S112), an operation of converting the skin color in an image is performed. First, a skin color model is established in operation S122. The skin color model may be established based on the color of a face region as a skin color, and distributing the skin color of the face region into a color region. A known 2-dimension (2-D) oval or 3-D standard skin color model in a color region may also be used without establishing the skin color model. In other words, the establishment of a skin color model may be selectively performed. A standard skin color model refers to a model deduced from a modeling experiment performed by using an image including a face or skin. A reference skin color model may be established in the form of a 2-D oval as an embodiment. Once the skin color model has been established, a skin pixel is extracted from an input image S124. Since the pixel classified as a skin color in the skin color model is determined to be the pixel of a region composing skin, the extracted pixel is converted into a desired skin color S126. When the conversion into the desired skin color is complete, an image including the converted skin color is output S128. The converted image may be stored, and storing the converted image is an embodiment.

Figure 2:
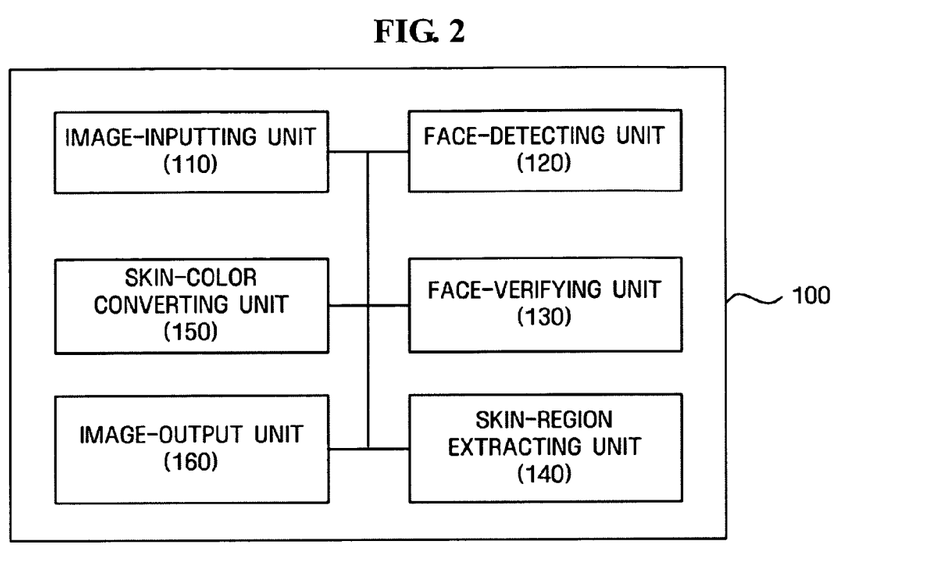
FIG. 2 is a block diagram illustrating a configuration of an image processing apparatus according to an embodiment of the present invention.

FIG. 2 is a block diagram illustrating a configuration of an image processing apparatus according to an embodiment of the present invention.

The term "unit" as used herein, means, but is not limited to, a software or hardware component, such as a Field Programmable Gate Array (FPGA) or an Application Specific Integrated Circuit (ASIC), which performs certain tasks. A module may advantageously be configured to reside in an addressable storage medium and to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

In addition to digital image processing devices such as digital cameras and digital camcorders, an image device 100 may include, by way of non-limiting examples, TVs, DVD players, computers, PDAs, mobile phones, and personal multimedia players (PMPs). Further, software that processes images may have the same configuration as that of FIG. 2.

An image input unit 110 receives an input of a file or an image from storage or from, for example, a digital camera or a digital camcorder, and outputs the input images to a face detecting unit 120.

The face-detecting unit 120 detects a face from an input image. The spatial position information of a face region is output in the image, and various methods may be applied to detect a face. An AdaBoost method, a neural network based method, and a statistical method are non-limiting examples these various methods. The AdaBoost is the configuration where a number of stages composed of weak classifiers are connected in the form of a cascade. Accordingly, if the detection fails in a current stage, a sub-window (a face candidate) is determined to be an image, i.e., a "non-face". Only the sub-windows having successful detections in the current stage are input to the next operation, and the image is considered to be a "face" when the detections have been successful throughout the stages. In order to distinguish an averted or a tilted face, not a front face, the sorter can be taught by using the faces respectively tilted toward x-, y-, and z-axes. The sizes of the sub-windows in parallel with x- and y-axes are converted and applied in order to detect faces of various sizes, as opposed to detecting a face with a single window.

A neural-network-based method allows a neural network to determine whether each window includes a face by examining small windows of an image. The method also can provide better performance by using a plurality of networks, as opposed to using a single network. A face can be determined by extracting a negative example. Here, a neural circuit can be taught by using the difference between a true value and a calculated value.

The statistical method is a method of recognizing objects by applying a classifier based on the statistics of localized parts. The classifier calculates the result obtained from matching each part with the images, and derives a probability according to the condition of the corresponding classification. The recognized object is determined through a likelihood ratio test. A method of improving the stage from a low resolution to a high resolution is also proposed herein.

When the face detecting unit 120 detects a face region of an image, a face-verifying unit 130 verifies whether the corresponding face region includes an actual face. As an example of the face verification, a face region may be verified based on information on the size of the detected face region, the proportion of pixels corresponding to the skin color in the face region, or the geometrical characteristics of a face such as symmetry.

If the face-detecting unit 120 and face-verifying unit 130 determine that a face does not exist in the image, the image is output or stored without converting the skin color in the image. Accordingly, when there is no face region including a face, i.e., a skin color, the skin color is not converted, thereby improving the image processing speed.

If it is determined that a face exists in the image, the skin color in the image is converted. A skin region extracting unit 140 extracts a skin region using a skin-color model. The skin-color model can use a skin color that has been created based on standard skin color, or it can also use the skin model created based on the pixel value of an area determined as the face region. Accordingly, the skin region extracting unit can create a skin color model. The skin color model is created by displaying the skin color of a face region in a color area. An image reference skin color model can be established in the form of a 2-dimensional oval in order to create a skin color model, and the pixel having a skin color in a whole image can be extracted using the skin color model.

A skin-color-converting unit 150 converts the extracted pixel into a desired skin color. The pixel classified as a skin color in a skin color model is determined as the pixel of a region comprising skin. Accordingly, the skin-color-converting unit 150 converts the extracted pixel into a desired skin color. When the conversion into a desired skin color is completed, an image including the converted skin color is output. An image-output unit 160 stores the converted image or outputs it to a display unit. Storing the converted image in digital image software can be an example of output.

Figure 3:
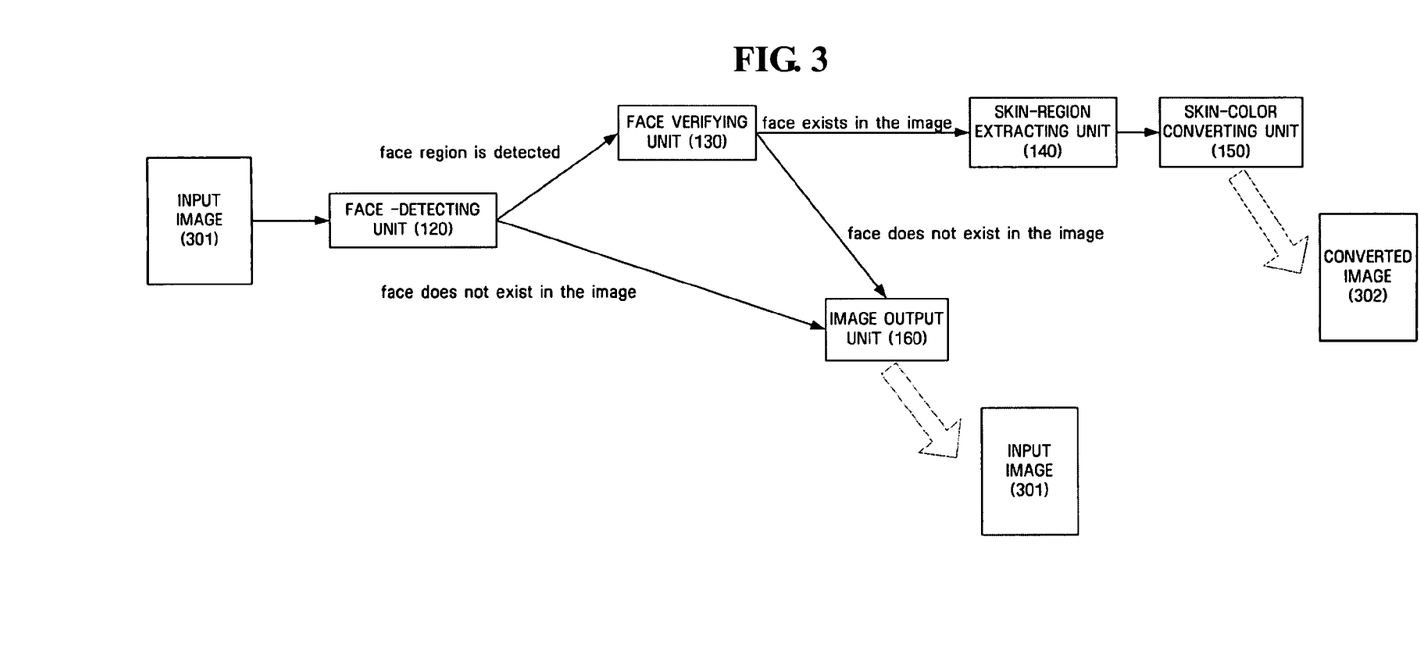
FIG. 3 is a flowchart illustrating an image processing process according to an embodiment of the present invention.

FIG. 3 is a flowchart illustrating an image processing process according to an embodiment of the present invention. For enhanced clarity only, this process is described with reference to the apparatus of FIG. 2.

A face-detecting unit 120 determines if a face exists by examining an input image 301. If a face doesn't exist, the processing rate is reduced by directly outputting an image from the image-output unit 160. When other conversions are required, the input image is output after the corresponding work has been performed.

Conversely, if a face exists, whether an error exists through a face detecting unit 130 is considered. That is, when an area detected as a face region is similar to the external shape of a human face such as a circle or an oval shape is presented, or an area that does not need converted in spite of it having a face (e.g. an animal or a doll), these conditions are taken into account. If it is determined that the detected face region is not a face during this course, the conversion into a desirable skin color is not performed, and the input image is output through an image output unit 160. As mentioned, the converted input image can be output after performing the corresponding work when another conversion is required.

When it is determined that a face exists, a process of converting the detected skin region into a desired skin color is performed. When a face does not exist in an input image, the time it takes to process the image can be reduced by omitting the process for extracting the skin region or converting the skin region into a desired skin color. Since the skin color can be converted into a desired color only when a face exists in an image, a skin region can be clearly extracted. Therefore, the number of errors can be reduced in a skin color conversion.

Figure 4:
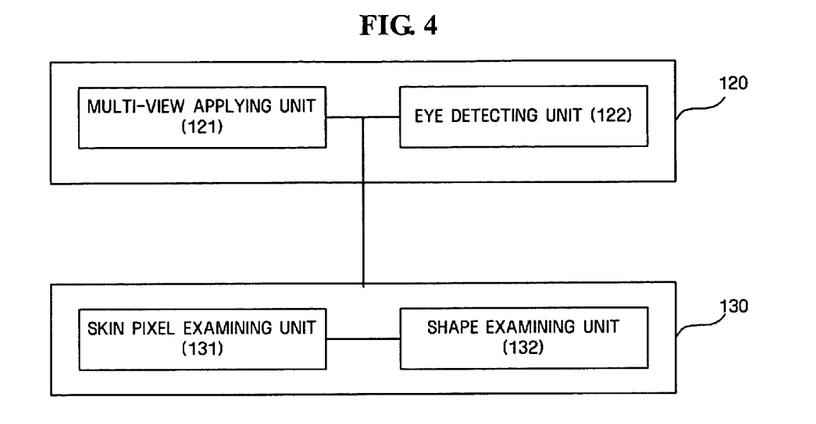
FIG. 4 is a block diagram illustrating the detailed configuration of a face-detecting unit and a face-verifying unit according to an embodiment of the present invention.

FIG. 4 is a block diagram illustrating the detailed configuration of a face-detecting unit and a face-verifying unit according to an embodiment of the present invention. A face-detecting unit 120 includes a multi-view applying unit 121 and an eye-detecting unit 122. A multi-view applying unit 121 detects a face when it is facing askew directions, such as to the front or the side. Therefore, oblique face can be detected as well as a frontal face. A face of a multi-view can be detected by detecting a face moving sub window in a screen, or by using a template with diversely rotated faces.

An eye-detecting unit 122 detects an eye based on the position of the pupil of the eye. The angle of rotation of a face can be obtained on the basis of z-axis through the position of the pupil of the eye. The position of the pupil of the eye detected by the eye-detecting unit 122 can be used during the face-verifying process based on the geometrical characteristics of a face in a shape-examining unit 132 below.

A face-verifying unit 130 verifies whether the region detected as a face corresponds to a face. A skin pixel examining unit 131 examines the proportion skin pixels existing in a skin region. As a result, it can be determined as a non-face if the proportion of skin pixels is lower than a certain proportion.

A shape-examining unit 132 examines if the area detected as a face region corresponds to the shape of a face. The shape-examining unit 132 can investigate if the detected face region has a similar shape to a face based on the geometrical characteristics, e.g. as an eye, a nose, and a mouth, or the symmetry of a face. The area detected as a face can be determined as a face if it has an error within a predetermined critical range.

Figure 5:
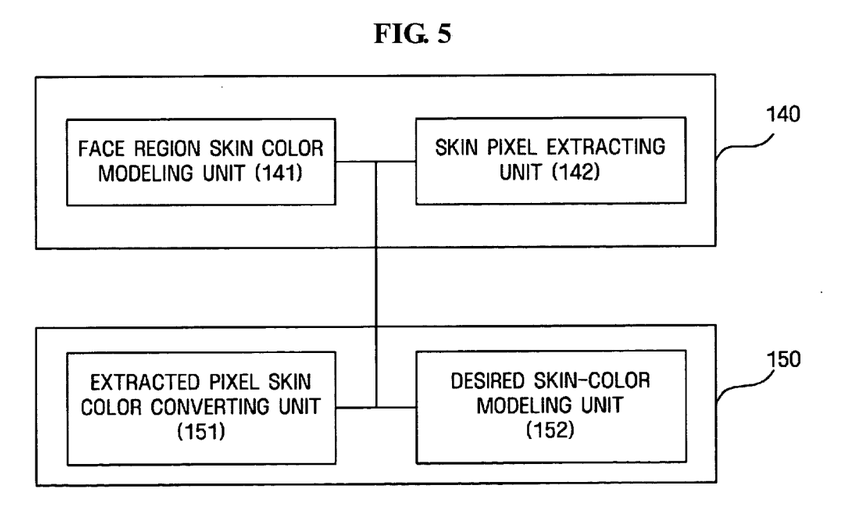
FIG. 5 is a block diagram illustrating the detailed configuration of a skin-color-extracting unit and a skin-color-converting unit according to an embodiment of the present invention.

FIG. 5 is a block diagram illustrating a detailed configuration of a skin-color detecting unit and a skin-color converting unit according to an embodiment of the present invention. A skin-color extracting unit 140 includes a skin color in a face-region-modeling unit 141 and a skin-pixel-extracting unit 142. A skin-color converting unit 150 includes a skin color in a detected-pixel-converting unit 151 and a desired skin-color modeling unit 152. The skin color-modeling unit 141 remodels a skin color region by determining the color of a pixel corresponding to the detected face region as an actual skin color existing in an input image, and using the actual skin color detected in a color region of an input image.

A skin-pixel-extracting unit 142 extracts the pixel corresponding to a remodeled skin color region from an image in order to set the color of a region determined to be a face region to a skin color by looking for corresponding colors and converting them into desired colors.

An extracted-pixel-skin-color converting unit 151 converts the pixels with skin color extracted from the skin-pixel-extracting unit 142 into a desired skin color. Based on the information on an actual skin color region extracted from an image, the extracting pixel skin color converting unit 151 can use the target color by adaptively converting it. The color can be converted based on a 2-D or 3-D skin color model by using a look up table (LUT) for converting a function mapping between two colors. A desired skin-color modeling unit 152 provides pre-selected colors, considering the preferences and the characteristics of an application device.

Figure 6:
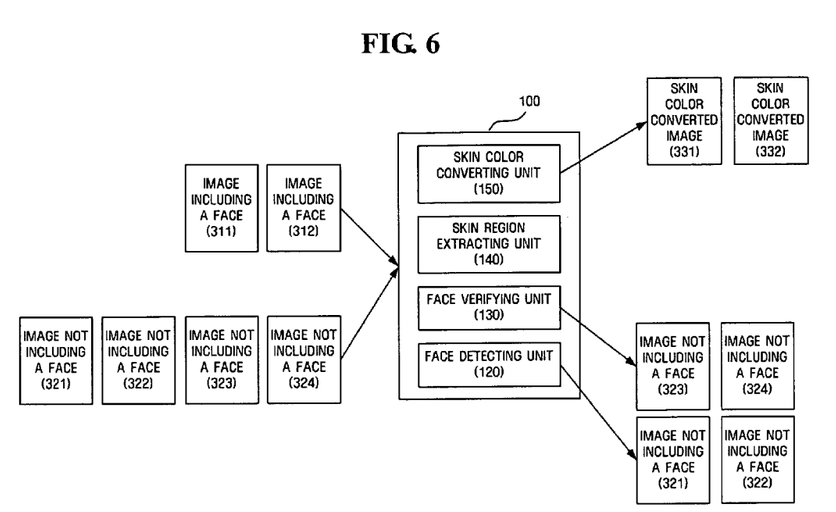
FIG. 6 is a view illustrating a process during which a number of images are processed in an image processing apparatus according to an embodiment of the present invention.

FIG. 6 is a drawing illustrating a process during which a number of images are processed in an image-processing apparatus according to an embodiment of the present invention.

Six images are processed by an image processing device. The images with a face 311, 312 and the images without a face 321, 322, 323, 324 are input to an image processing device, and output according to the flowchart of FIG. 3. The images 321, 322, in which a face has not been detected by the face-detecting unit 120, are directly output. If the processing rate in a face-detecting unit 120 is defined as $T_{detect}$, the time needed for processing two images 321, 322 is $2T_{detect}$. Meanwhile, the images 323 and 324 determined not to have a face may consume even the rate consumed for processing. If the time the face-verifying unit 130 takes to process an image is defined as $T_{verify}$, $2T_{verify}$ is needed. Therefore, the time of $2T_{detect}+2T_{verify}$ is needed for outputting two images 323 and 324.

Meanwhile, the images with faces are converted into a skin color 331 and 332 through a skin-region-extracting unit 140 and a skin-color-converting unit 150. When the processing rate in the skin-region-extracting unit 140 and the skin-color converting unit 150 is defined as Tconvert, the time needed for converting the images 311 and 312 into 331 and 332 is defined as 2Tdetect+2Tverify+2Tconvert.

Therefore, the time needed for converting the skin colors of six images is defined: 6Tdetect+4Tverify+2Tconvert.

The aforementioned embodiments of the present invention provide an improved accuracy and an improved conversion rate when applying a skin color conversion, by inhibiting a skin color conversion of an image that does not contain a face.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. An image-processing method that converts a skin color of an image implemented by an image processing apparatus comprising a processor having computing device-executable instructions, the method comprising:
    detecting a face region of an image using multi-view;
    verifying that the face region contains a face by analyzing characteristics of the face region when a face region is detected;
    establishing a skin color model when the face region is verified to contain the face, wherein the skin color model is created in a two-dimensional oval by using skin color that is created based on a pixel value of the detected face region and by displaying skin color of the face region in a color area;
    extracting a skin region from the image using the skin color model, wherein when color of a pixel is classified as a skin color in the skin color model, the pixel is determined to be a pixel of the skin region; and
    converting the skin color of the extracted skin region into a desired skin color,
    wherein the multi-view is moving sub window in a screen, or using a template with diversely rotated faces, and
    wherein when the image includes the detected face region, the image is a whole image including pixels inside and outside of the face region.

2. The method of claim 1, wherein the characteristics of the face region comprise a proportion of pixels corresponding to a skin color.

3. The method of claim 1, wherein the characteristics of the face region comprise a result obtained by comparing a symmetry of a face of the face region.

4. The method of claim 1, wherein the skin color model is further created by selectively using skin color that has been created based on standard skin color or skin color that is created based on a pixel value of the detected face region, and wherein the extracting includes extracting a pixel having a skin color using a standard skin color model when the skin color that has been created was created using the skin color based on the standard skin color.

5. The method of claim 1, wherein the converting comprises:
    locating an extracted skin color from the extracted skin region in a color region;
    calculating a target point for converting of the extracted skin color distributed in the color region by obtaining datum points of a standard color region and the color region; and
    converting the skin color based on the calculated target point.

6. The method of claim 1, further comprising maintaining the image when a face region is not detected.

7. The method of claim 1, further comprising maintaining the image when the face region does not contain a face.

8. An image processing apparatus that converts a skin color of an image, comprising:
- a processor;
- a face determining unit, controlled by the processor, that determines an existence of a face by extracting a face region of an image, maintains the image when a face does not exist in the image, and outputs the face region when a face exists in the image; and
- an image-converting unit, controlled by the processor, that receives the face region from the face-determining unit, establishes a skin color model when the face region is verified to contain the face, extracts a skin region from the image using the skin color model, wherein when color of a pixel is classified as a skin color in the skin color model, the pixel is determined to be a pixel of the skin region, and converts a skin color of the extracted skin region in the image into a desired skin color,
- wherein when the image includes the face region, the image is a whole image including pixels inside and outside of the face region,
- wherein the skin color model is created in a two-dimensional oval by using skin color that is created based on pixel value of the detected face region and by displaying skin color of the face region in a color area, and
- wherein the face determining unit detects the face region of the image using multi-view, the multi-view is moving sub window in a screen, or using a template with diversely rotated faces.

9. The apparatus of claim 8, wherein the face-determining unit comprises:
- a face-detecting unit that detects the face region of the image; and
- a face-verifying unit which receives the face region, analyzes characteristics of the face region to verify that the face region contains a face, maintains the image when the face region does not contain a face, and outputs the face region to the image-converting unit when the face region contains a face, and
- wherein the characteristics of the face region comprise a proportion of pixels corresponding to a skin color.

10. The apparatus of claim 8, wherein the face-determining unit comprises:
- a face-detecting unit that detects the face region of the image; and
- a face-verifying unit which receives the face region, analyzes characteristics of the face region to verify that the face region contains a face, maintains the image when the face region does not contain a face, and outputs the face region to the image-converting unit when the face region contains a face, and
- wherein the characteristics of the face region comprise a result obtained by comparing a symmetry of a face.

11. The apparatus of claim 8, wherein the image-converting unit comprises:
- a skin-region-detecting unit that receives the face region from the face-determining unit, and that extracts a skin region from the image based on the face region; and
- a skin-color-converting unit that converts a skin color of the skin region in the image.

12. The apparatus of claim 11, wherein the skin-region-detecting unit generates the skin color model based on the face region and extracts pixels having the skin color using the skin color model.

13. The apparatus of claim 11, wherein the skin-color-converting unit distributes the skin color extracted by the skin region extracting unit in a color region, calculates a target point for converting the extracted skin color distributed in the color region by obtaining the datum points of a standard color region and the color region, and converts the skin color based on the detected target point.

14. An image-processing method implemented by an image processing apparatus comprising a processor having computing device-executable instructions, the method comprising:
- detecting whether at least one face region is present in a received image, the received image being obtained using multi-view;
- verifying that a face is present in the detected at least one face region;
- establishing a skin color model when a face is present, wherein the skin color model is created in a two-dimensional oval by using skin color that is created based on a pixel value of the at least one detected face region and by displaying skin color of the face region in a color area;
- extracting a skin pixel including a skin color from the received image using the skin color model, wherein when color of a pixel is classified as a skin color in the skin color model, the pixel is determined to be a pixel of the skin region; and
- converting the skin color of the extracted skin pixel into a desired skin color based on the skin color model,
- wherein the multiview is moving sub window in a screen, or using a template with diversely rotated faces, and
- wherein when the received image includes at least one detected face region, the received image is a whole image including pixels inside and outside of the at least one face region.

15. The method of claim 14, further comprising, when at least one face region is not present in the received image, outputting the image without executing the extracting and converting.

16. The method of claim 14, further comprising, when a face is not present in the at least one face region, outputting the image without executing the extracting and converting.

17. The method of claim 14, wherein, in the verifying, the presence of a face in the at least one face region is verified based on a size of the detected at least one face region, a proportion of pixels corresponding to a skin color in the at least one face region, or geometrical characteristics of the at least one face region.

18. The method of claim 14, wherein the skin color model is a 2-dimension (2-D) oval skin color model or a 3-D skin color model.

19. The method of claim 14, wherein the detecting uses an AdaBoost method, a neural network based method, or a statistical method.

20. A non-transitory computer-readable storage medium encoded with processing instructions for causing a processor to execute an image-processing method that converts a skin color of an image, the method comprising:
- detecting a face region of an image using multi-view;
- verifying that the face region contains a face by analyzing characteristics of the face region when a face region is detected;
- establishing a skin color model when the face region is verified to contain the face, wherein the skin color model is created in a two-dimensional oval by using skin color that is created based on a pixel value of the detected face region and by displaying skin color of the face region in a color area;
- extracting a skin region from the image using the skin color model, wherein when color of a pixel is classified as a skin color in the skin color model, the pixel is determined to be a pixel of the skin region; and converting the skin color of the extracted skin region into a desired skin color based on the skin color model, wherein the multi-view is moving sub window in a screen, or using a template with diversely rotating faces, and wherein when the image includes the detected face region, the image is a whole image including pixels inside and outside of the face region.

21. A non-transitory computer-readable storage medium encoded with processing instructions for causing a processor to execute an image-processing method that converts a skin color of an image, the method comprising:

detecting whether at least one face region is present in a received image, the received image being obtained using multi-view;

verifying that a face is present in the detected at least one face region is a face;

establishing a skin color model when a face is present, wherein the skin color model is created in a two-dimensional oval by using skin color that is created based on a pixel value of the at least one detected face region and by displaying skin color of the face region in a color area;

extracting a skin pixel including a skin color from the received image using the skin color model, wherein when color of a pixel is classified as a skin color in the skin color model, the pixel is determined to be a pixel of the skin region; and converting the extracted skin color of the extracted skin pixel into a desired skin color based on the skin color model, wherein the multi-view is moving sub window in a screen, or using a template with diversely rotated faces, and wherein when the received image includes at least one detected face region, the received image is a whole image including pixels inside and outside of the at least one face region.

* * * * *